March 8, 1960

P. J. BILY 2,927,607

FLUID TRANSFERRING APPARATUS

Filed March 25, 1957

INVENTOR
PETER J. BILY

BY *Hans G. Hoffmeister*
ATTORNEY

March 8, 1960

P. J. BILY

2,927,607

FLUID TRANSFERRING APPARATUS

Filed March 25, 1957

INVENTOR
PETER J. BILY

BY *Hans G. Hoffmeister*

ATTORNEY

United States Patent Office 2,927,607
Patented Mar. 8, 1960

2,927,607

FLUID TRANSFERRING APPARATUS

Peter J. Bily, Chino, Calif., assignor to Food Machinery and Chemical Corporation, San Jose, Calif., a corporation of Delaware Application March 25, 1957, Serial No. 648,230

6 Claims. (Cl. 137—615)

This invention relates to fluid handling equipment, and more particularly to apparatus for transferring fluid from one fluid handling means to another.

An object of the invention is to provide an improved fluid transferring apparatus.

Another object is to provide improved and simplified apparatus for temporarily establishing fluid-conveying interconnection between separate fluid containers without requiring exact spacing between the containers, thereby adapting the apparatus for use in loading and unloading fluid-carrying vehicles.

Another object is to provide apparatus adapted to maintain efficient fluid-conveying communication between fluid-delivering and fluid-receiving conduits between which relative motion is apt to occur, thus particularly adapting the apparatus of the invention for such uses as supplying fuel oil or water to ships, and loading and unloading marine tankers and oil or water-carrying barges.

Another object of the present invention is to provide apparatus for temporarily establishing fluid-conveying communication between separate fluid conduits, such as an oil supply line on a dock and an oil receiving line on a barge, which apparatus is maneuverable to and from operative position easily, quickly, and without the man-handling or the hazards of injury to personnel or equipment that characterize the heavy and cumbersome flexible hoses commonly employed for loading and unloading liquid-transporting marine carriers.

Another object is to provide a tanker or barge loading and unloading apparatus including a hose made up of a plurality of pivotally interconnected rigid tubing sections and so arranged that a lone operator on the dock can easily and with little effort maneuver the distal end of the hose into a position so close to a selected conduit on a tanker or barge that they can easily be coupled together.

Another object is to provide fluid-handling apparatus for marine use, including a plurality of pivotally interconnected rigid tubes adapted to be mounted on a loading wharf or pier and so supported and operated that when not in use they can be disposed in an elevated position out of the way of traffic.

Another object of the invention is to provide a fluid-handling hose construction including rigid, pivotally interconnected tubing sections movable optionally to an extended, operative position or to an inoperative, retracted position, and including means for counterbalancing the movable parts of the apparatus in any position throughout its full range of movement.

These and other objects and advantages of the present invention will become apparent from the following description and the accompanying drawings in which.

The fluid transferring apparatus of the present invention comprises an articulated hose A (Figs. 1, 2 and 3) including two rigid tubes B and C, respectively, arranged substantially in end-to-end relation. The inner section B of the hose is carried by a suitable supporting structure such as a loading or unloading dock D for tank trucks or marine vessels. The inner hose section B is pivotally mounted for universal movement about horizontal and vertical axes adjacent one end of the section, so that it serves as a supporting boom for the outer hose section C, which is pivotally connected to the outer end of the inner section B. A conduit E is in constant communication with the hose A to supply fluid to, or to receive fluid from the same, depending upon whether the apparatus is used for loading or unloading operations. Whereas the outer hose section C is pivotally connected to the outer end of the inner hose section B for pivotal movement relative thereto about a horizontal axis, it is retained in position projecting horizontally from the distal end of the inner hose section, regardless of the position to which the inner hose section B is swung. This feature enables a lone operator on the dock to maneuver the hose into a position wherein it is an easy matter for one person to couple the distal end of the hose to a selected conduit F (Figs. 7–10) on a barge G or other vessel moored to the dock.

Such maneuvering of the hose A, as well as that which returns the hose to its retracted position, is facilitated by a mechanism H (Figs. 2 and 6) that effectively counterbalances gravitational forces acting on the apparatus, and thereby causes the apparatus to remain in any position to which it my be adjusted. Nevertheless, the counterbalancing mechanism H is yieldable and the swivel joints that interconnect the two hose sections, as well as those that pivotally support the inner hose section and connect the same to the stationary conduit E on the dock D, are freely movable. Therefore, the apparatus is enabled to accommodate itself to any normal movements of the barge relative to the dock while a loading or unloading operation is in progress, so that rising or falling tide, movement of the ship along or toward or away from the dock, and changes in the vessel's freeboard due to increased or decreased extent of loading will have no harmful effect upon the apparatus or upon its efficiency in conducting fluid between dock and vessel.

The fluid transferring apparatus of the invention is supported upon a base 12 (Figs. 1, 2 and 3) comprising two spaced parallel channel members 14 resting upon and welded to a pair of bottom plates 16 and supporting and welded to a top plate 18. The base 12 not only provides means for mounting the fluid transferring apparatus of the invention upon the dock D, but also rigidly supports the fixed conduit E, which terminates in a riser pipe 20 extending vertically upward through and welded to the top plate 18 of the base 12.

A swivel pipe joint 22 (Fig. 3) on the upper end of the riser pipe 20 supports a 90° elbow 24 for free rotation about the vertical axis of the riser pipe 20 and establishes fluid conducting communication between the stationary conduit E and the elbow 24. Since the details of construction of the swivel joint 22 do not comprise part of the present invention, it will suffice for the purposes of the present disclosure to explain that the swivel joint 22 may be of conventional construction including a lower tubular member 26 rigidly secured to the riser pipe 20 and an upper tubular member 28 rotatably carried by the lower member 26 so as to establish a fluid conducting passage through the swivel joint 22. A suitable fluid seal (not shown) prevents leakage of fluid between the relatively movable sections 26 and 28 of the swivel joint 22.

Figures 3, 4, 5:
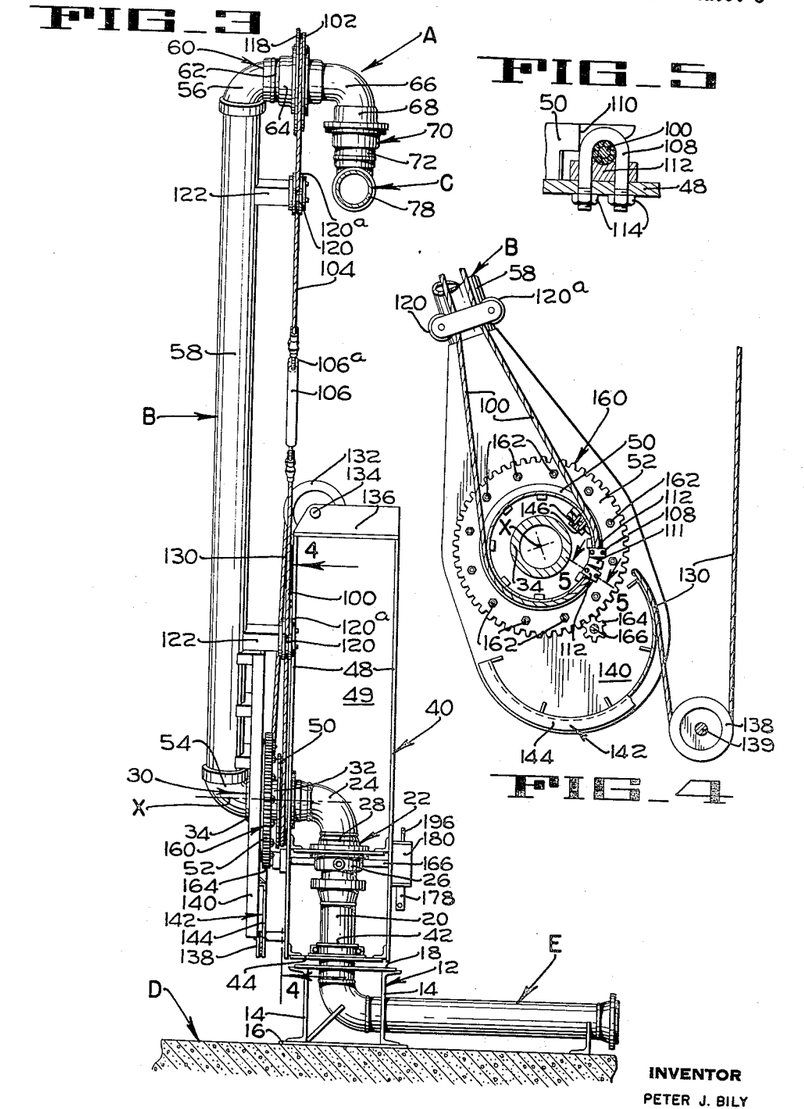
Fig. 3 is an elevation partly in section along lines 3—3 of Fig. 2.
Fig. 4 is an enlarged fragmentary section along lines 4—4 of Fig. 3.
Fig. 5 is an enlarged detail in section along lines 5—5 of Fig. 4.

While the lower end of the elbow 24 is disposed with its axis vertical and in alignment with the axis of the riser pipe 20, the axis of the upper end of the elbow 24 is horizontal and coincides with that of a second swivel pipe joint 30, which likewise may be of conventional construction including a tubular member 32 rigidly secured to the upper, horizontal leg of the elbow 24 and a tubular member 34 rotatably carried by the member 32 and provided with sealing means (not shown) for preventing leakage between the relatively rotatable members 32 and 34.

A frame 40 (Figs. 1, 2, 3 and 6) is rigidly secured to the upper, or rotatable, member 28 of the swivel joint 22 and to the tubular member 32 of the swivel joint 30, both of which are rigid with the elbow 24. Consequently, the frame 40 is mounted for freedom of movement about the vertical axis of the riser pipe 20. An annular bracket 42 (Fig. 3) loosely embracing the riser pipe 20 and rigidly secured to the bottom plate 44 of the frame 40 guides the frame 40 in such rotary motion and aids in retaining the frame 40 in an erect position. The frame 40 comprises a housing for a counterweight 46 (Fig. 6) which will be described more fully hereinbelow, and includes two spaced vertical side plates 48 rigid with and extending upward from the bottom plate 44 and interconnected by two vertical transversely extending plates 49 that are spaced apart to accommodate therebetween the counterweight 46 for which they and the associated portions of the side plates 48 serve as guides.

A pulley 50 (Figs. 2, 3 and 4) is rigidly secured to one of the side plates 48 of the housing in position encircling and concentric with the swivel joint 30, and the swivel joint member 34 (Fig. 3) which is rotatable relatively thereto carries a large gear 52 (Figs. 3 and 4) rigid with and disposed coaxially with respect to the rotatable member 34 of the swivel joint 30. The rotatable member 34 carries a 90° elbow 54 (Figs. 2, 3, and 6) that comprises the inner end of the inner section B of the hose A. The hose section B includes another 90° elbow 56 (Figs. 2 and 3) at its outer end. Thus the inner hose section B includes an intermediate, straight tubular portion 58 and the elbows 54 and 56 at its ends. The axes of the laterally projecting legs of the two elbows 54 and 56 are parallel to each other, and since the axis of the laterally projecting leg of the elbow 54 at the inner end of the tube 58 coincides with the horizontal axis of the swivel joint 30, the axis of the laterally facing portion of the elbow 56 likewise, is always horizontal.

A swivel pipe joint 60 (Fig. 3) similar to the swivel joints 22 and 30, is carried by the elbow 56 at the outer end of the hose section B, one tubular member 62 of the swivel joint 60 being rigidly affixed to the horizontal leg of the elbow 56 in coaxial alignment with the same, and the other tubular member 64 of the swivel joint 60 being rotatable with respect to the member 62 about the same horizontal axis. The inner, horizontal leg of a 90° elbow 66 (Figs. 1 and 3) is affixed to the rotatable member 64 of the swivel joint 60 in coaxial alignment therewith while the outer leg of the elbow 66 projects vertically downward and is rigidly connected to one tubular member 68 of a swivel pipe joint 70. The swivel joint 70 is likewise similar to the swivel joints 22 and 30.

The outer hose section C is rigidly connected to the other tubular member 72 of the swivel joint 70 by a 90 degree elbow 74 that comprises the inner end of the outer hose section C; and since the swivel joint 70 is constantly maintained with its axis vertical (by mechanism presently to be described) the outer hose section C is retained in an attitude projecting horizontally from the outer end of the inner hose section B. However, the outer hose section C is free to rotate about the vertical axis of the swivel joint 70, and therefore can be caused to project in any horizontal direction from the inner hose section B, except for the relatively slight interference presented by the inner section B itself, which prevents the outer section C from projecting into but only a small part of the full 360° about the vertical axis of the swivel joint 70. The outer hose section C includes at its outer end a downwardly directed elbow 76 (Figs. 1 and 2) whose horizontal leg is firmly secured to the outer end of the rigid tube 78 that constitutes the intermediate part of the hose section C.

Releasable coupling means 80 (Figs. 1 and 2) is carried by the outer hose section C for operably connecting the same to any desired fluid supplying or receiving means. Whereas any suitable type of coupling means 80 may be employed, the apparatus is illustrated as equipped with a conventional pipe flange 82 adapted to be releasably secured by bolts 84 (Figs. 9 and 10) to a complementary flange 85 (Figs. 7 and 8) at the end of a conduit such as the conduit F communicating with a tank (not shown) of an oil barge G so as to establish communication between the conduit F and the hose A of the apparatus of the invention. The coupling flange 82 is connected to the elbow 76 at the distal end of the hose section C by means of a universally adjustably tubular connection including three swivel pipe joints 86, 88 and 90, respectively (which may be similar to the hereinbefore mentioned swivel joints 22, 30, 60 and 70), a 90° elbow 92 between the swivel joints 86 and 88, and a 90° elbow 94 between the swivel joints 88 and 90. This arrangement of swivel joints and elbows permits the flange 82 to be adjusted to face in any direction, and to be rotated about its own axis so as to align the bolt holes in the flange 82 with the bolt holes in a complementary flange to which connection is to be made.

The mechanism for retaining the outer hose section C in horizontal orientation includes the hereinbefore mentioned pulley 50 (Figs. 2, 3 and 4) that is secured in fixed relation to the horizontal, i.e., is prevented from turning about its own horizontal axis by being secured to one of the side plates of the housing 40. The middle part of a cable 100 is trained around the pulley 50, from which both ends of the cable 100 extend toward the swivel joint 60 at the outer end of the inner hose section B. A pulley 102 having the same diameter as the pulley 50 is firmly secured to the tubular member 64 of the swivel joint 60 in planar alignment with the pulley 50, and the middle part of a cable 104 is trained around the pulley 102. The ends of the cable 104 extend from the pulley 102 toward the ends of the cable 100, to which they are joined by turnbuckles 106 and 106a, by which the cables 100 and 104 can be tightened sufficiently to prevent their slipping on their respective pulleys 50 and 102. Added security against slipping of the cable 100 on the pulley 50 is attained by means of two U-bolts 108 (Figs. 4 and 5) embracing the cable 100 within a cut-away part 110 of the pulley 50, against the ends of which the U-bolts are held by a spacer 111.

A saddle block 112 is associated with each U-bolt 108, the legs of the U-bolt passing through spaced clearance holes in the saddle block and through clearance holes in the side plate 48 of the frame 40 to which the pulley 50 is attached. Hence, when nuts 114 threaded on the end portions of the legs are tightened, the cable 100 is clamped between the U-bolts 108 and the saddle blocks 112, thereby effectively immobilizing the cable 100 with respect to the sideplate 48 and the pulley 50. The cable 104 is similarly anchored to the pulley 102 by U-bolts 116 (Figs. 1 and 2) the legs of which extend through the side plate 118 of the pulley 102 to receive nuts 119 (Figs. 2), whereby the cable can be clamped between the U-bolts 116 and saddle blocks (not shown) associated therewith. Each cable 100, 104 is engaged by a pair of idler pulleys 120, 120a (Figs. 1–3) mounted by a bracket 122 (Fig. 3) adjacent the associated end of the inner hose section B in a manner confining the cables to a spacing somewhat less than the diameter of the tube 58 that constitutes the intermediate part of the inner hose section B.

Since the lower pulley 50 is prevented from turning about its axis by being secured to the frame 40, the upper pulley 102, which is connected to the pulley 50 by the cables 100 and 104, is likewise prevented from turning about its axis, regardless of whether the inner hose section B remains motionless or pivots about the horizontal axis X (Figs. 2, 3, and 4) of the swivel joint 30 at the lower end of the hose section B. The upper pulley 102 is rigid with the elbow 66 to whose vertical leg the swivel joint 70 at the inner end of the outer hose section C is secured. Therefore, the upper, non-rotatable pulley 102 operates to maintain the axis of the swivel joint 70 vertical, so that although the outer hose section C is free to swing horizontally about the vertical axis of the swivel joint 70, the outer hose section C is constantly retained in an attitude projecting horizontally from the upper, or outer end of the inner hose section B.

The hereinbefore mentioned counterweight 46 (Fig. 6) is supported by a cable 130 (Figs. 1–4 and 6) secured at one end to the counterweight 46 and extending upward therefrom to and around a pulley 132 journalled on a pin 134 carried by angle bars 136 that extend across the top of the frame 40 within which the counterweight 46 is suspended. From the pulley 132, the cable 130 extends downward outside the frame 40, to and around a pulley 138 journalled on a pin 139 projecting from the frame 40 adjacent the lower end thereof. The cable 130 extends upward from the pulley 138 to a plate 140 that is rigid with the inner hose section B and which projects therefrom past the axis X (Figs. 2, 3 and 4) of the swivel joint 30, which is the axis about which the inner hose section B turns as the hose A moves between withdrawn and projected positions. The cable 130 is engaged with the end of the plate 140 opposite that to which the hose section B is secured; and therefore the force derived from the weight of the counterweight 46 is exerted against the plate 140 in a manner tending to equilibrate the turning moment imposed upon the plate 140 by the weight of the hose A.

It is to be observed, however, that the turning moment resulting from the weight of the hose A is not constant as the result of the variation of the distance of the center of gravity of the combined weight of the hose A and the coupling means 80 from the vertical plane that includes the axis A as the angularity of the hose section B varies. Means are provided for causing the countertorque imposed by the counterbalance 46 to vary as the angularity of the hose section B changes, in a manner generally similar to the manner in which the turning moment of the hose section B varies. A cable positioning guide 142 (Figs. 3, 4 and 6) is provided by means of a strip 144 of angle stock (see Fig. 3) bent to arcuate form and welded to a face of the plate 140 so that the strip 144 and the plate cooperate to define a cable-receiving channel extending through an arc of slightly more than 180° and disposed with the center of the arc offset beyond the axis X from the hose section B, as clearly shown in Fig. 4. The cable 130 is attached by clamps 146 (Fig. 4) to the plate 140 in such position that the cable lies within the channel-shaped outer face of the guide 142; and when the hose section has been swung upward to its most nearly vertical position, as shown in Figs. 1–4, and consequently is exerting its minimum turning moment about the axis X, the cable applies its minimum countertorque to the plate 140. As the hose section B swings downward, and thus is caused to exert a progressively greater turning moment upon the plate 140, the cable 130 is caused to exert its pull upon the plate at a progressively greater distance from the axis X, measured perpendicularly to the direction of the pull, with the result that the countertorque likewise becomes progressively greater.

Figure 1:
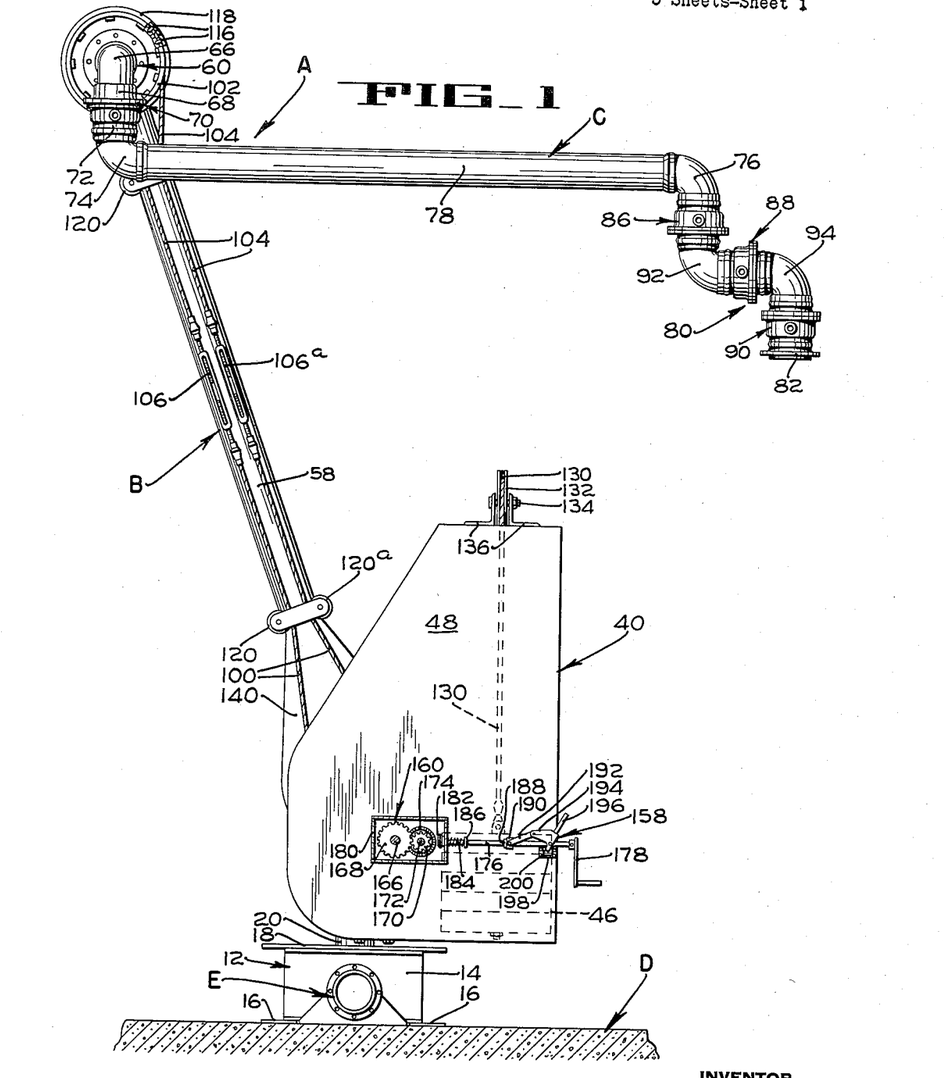
Fig. 1 is a side elevation of the fluid transferring apparatus of the invention.

Thus, the tendency for the hose A to gravitate away from any position to which it may be adjusted is minimized by the counterweight 46. It is impractical to design the apparatus so that the counterweight 46 exactly balances the weight of the hose A and coupling means 80, because the outer hose section C can be swung to various positions relative to the inner hose section A, and in each of such various positions its weight and that of the coupling means 80 exert a different turning moment upon the inner hose section B about the axis X. This is most readily appreciated by comparison of Figs. 1 and 2, in both of which the inner hose section B is shown in the same position sloping upward and forward. In Fig. 1, the outer hose section C projects rearward from the upper end of the inner hose section B, and, due to the weight of the coupling means 80 at the distal end of the section C, the center of gravity of the combined outer hose section C and the coupling means 80 is to the rear of the vertical plane that includes the axis X. It is clear, therefore, that with the apparatus arranged as shown in Fig. 1, the effect of the hose section C upon the section B is to urge the latter to swing rearward, i. e., clockwise as viewed in Fig. 1, whereas when disposed as in Fig. 2, the outer hose section C adds very considerably to the tendency for the section B to swing forward, i.e., clockwise as viewed in Fig. 2.

It is not necessary, however, to rely upon the counterweight alone, to cause the hose A to remain in any selected position without being fastened therein. This is because a manually operable drive 158 (Fig. 1) is employed for turning the hose section B about the axis X, which includes a gear train 160 having such a high gear ratio that any residual turning moment of the inner hose section B for which the counterweight 46 is unable to compensate, is of insufficient magnitude to overcome the resistance to rotation that is offered by the gear train to a force applied to the output end thereof.

The hereinbefore mentioned relatively large gear 52 (Figs. 3 and 4) is the final, or output, gear of the gear train 160. It is disposed in position encircling the tubular member 34 of the swivel joint 32, with its axis coinciding with the axis X. The gear 52 is secured by bolts 162 to the plate 140, which, as already explained, is rigid with the inner hose section B. The gear 52 is enmeshed with a small driving gear 164 carried by a shaft 166 journalled in and extending transversely of the frame 40. At the opposite side of the frame 40 from the gears 52 and 164, the shaft 166 carries a large driven gear 168 (Fig. 1) that is enmeshed with a small driving gear 170 carried by a countershaft 172 which likewise carries a relatively large, driven bevel gear 174.

A crankshaft 176 having a manually rotatable crank 178 affixed to its outer end, is rotatably mounted on one of the side plates 48 of the frame 40 with the inner end of the crankshaft 178 extending through a side wall of a gear box 180, which encloses the gears 168, 170 and 174 and the countershaft 172, as well as a small, driving bevel gear 182 affixed to the inner end of the crankshaft 176. In addition to being rotatable, the crankshaft 176 is capable of a limited degree of axial movement, and a spring 184 under compression between the gear box and a collar 186 rigid with the crankshaft 176, constantly urges the crankshaft outward of the gear box 180 toward a position in which the driving gear 182 is disengaged from the driven gear 174.

The crankshaft 176 carries a second collar 188 rigid therewith and adapted to be engaged by a collar 190 fitted on the crankshaft 176 so loosely that the crankshaft 176 and collar 190 are free to turn and to move axially relatively to each other. One end of each of two links 192 (one shown) is pivoted to the loose collar 190 and at its other end to a forward extension 194 of a manually operable lever 196 that is pivotally mounted upon a bracket 198 rigid with the frame 40. The lower end of the lever 196 projects beyond the axis of its pivotal mounting so that when the upper, handle part of the lever is swung rearward, the lower end of the lever engages a stop pin 200 that limits rearward swinging of the lever.

As the lever 196 swings toward the rear, the forward extensions 194 swing upward, raising the rear ends of links 192 far enough to permit the collar 190, and with it the crankshaft 176, to move under the influence of the spring 184, axially toward the rear far enough to permit the bevel gear 182 to move out of mesh with the gear 174. In this manner, the crankshaft 176 is disconnected from the gear train 160, so that the inner hose section B is free to pivot about the horizontal axis X without causing the handle 178 to rotate. This eliminates danger of injury to personnel that might otherwise be struck by the handle 178 when the sufficient force is imposed upon the hose A to induce such movement of the inner section B thereof.

The parts are so proportioned and arranged that as the rear ends of the links 192 swing upward, they pass through the plane that includes both the axis of the pivotal connection to their forward ends to the loose collar 190 and the axis of their pivotal connection to the lever 196. Thus, the collar 190, links 192 and lever 194 function as an "over-center" mechanism releasably retained in retracted position by the spring 184. Alternatively, the spring 184 releasably retains the parts in their forwardly projected position, wherein the gears 182 and 174 are in meshing engagement, since the rear ends of the links 192 again pass through the plane of the axes of the pivotal connections of both ends of the links as the handle 196 is swung forward. The rear ends of the links move far enough beyond this plane to permit the loose collar to move a slight distance to the rear as the handle reaches its forward limit of movement, to a position in which it is yieldably retained by the spring 184 until the handle 196 is again operated to effect retraction of the crankshaft 176 and gear 182 as above outlined.

*Operation*

Figure 1 illustrates the preferred arrangement of the fluid transferring apparatus of the invention when it is not in use. The inner hose section B slopes forward from the vertical to dispose the middle part of the rearwardly projecting outer hose section C above the frame 40. When so arranged, the entire apparatus occupies minimum space, with the entire hose A elevated out of the way of traffic on the dock D on which the apparatus is installed. Moreover, the entire hose A and the coupling means 80 are disposed with the center of gravity of the combined structure approximately in vertical alignment with the axis X, and consequently so nearly in a position of equilibrium that all danger that the hose A might be moved by gravity while unattended is eliminated.

When it is desired to place the apparatus into operation, as for the purpose of loading an oil barge G (Figs. 7–10) moored to the dock D, the outer hose section C should be swung to a forwardly projecting position. If this is done as the initial step in shifting the hose A to a position in which connection with the fluid-receiving conduit F on the barge G can be established, the outer hose section C will assume a position such as that illustrated in Fig. 2, to which it will have swung approximately 180 degrees about the vertical axis of the swivel joint 70. However, such manipulation of the outer hose section C can usually be accomplished more easily if it is first lowered far enough to be within the reach of a person standing on the dock. This is accomplished by first swinging the handle 196 (Fig. 1) forward to engage the gear 182 with the gear 174 of the drive mechanism 160, whereupon the operator can, by turning the crank 178, cause the inner hose section B to pivot downward about the axis X of the swivel joint 30 at the inner end of the hose section B.

As the inner hose section B swings downward in pivotal movement, the outer hose section partakes of translatory movement in an arcuate path, being maintained in its horizontal orientation by the non-rotating driving pulley 50 and the driven pulley 102 that is prevented from rotating by means of the cables 100 and 104 interconnecting the two pulleys, as hereinbefore explained. Consequently, the axis of the swivel joint 70 that supports the outer hose section C remains vertical, and it is an easy matter for an operator to manually swing the hose section C to a forwardly projecting position when the same has been lowered far enough to be within reach.

The fluid transferring apparatus of the invention is mounted in a position so close to the edge of the dock D that when the outer hose section has been swung forward, it will project over a barge G moored alongside the dock. Accordingly, the operator on the dock can easily estimate just how much to lower or raise the hose to dispose the coupling flange 82 thereof at the optimum elevation to permit coupling the hose to the fluid receiving conduit F on the barge G, and by proper manipulation of the crank 178, easily and quickly attain such adjustment of the apparatus. When this is accomplished a lone person on the barge can easily bring the flange 82 at the distal end of the coupling means 80 into coupling relation with the flange 85 on the conduit F of the barge G, by swinging the outer hose section C about the axis of its supporting swivel joint 70, or by swinging the inner hose section B about the vertical axis of the swivel joint 22 (Fig. 3), or by swinging both hose sections B and C, as determined by the position of the barge flange 85 relative to the mounting of the apparatus on the dock D.

When thus positioned in engagement with the barge flange 85, the hose flange 82 should be secured thereto by bolts 84 (Figs. 9 and 10) in the customary manner, whereupon the pumping operation may be started to fill the barge tank or tanks with fluid supplied to the transferring apparatus of the invention by the conduit E on the dock D. Obviously, the fluid transferring apparatus of the invention can be used for unloading as well as for loading barges or other vehicles, depending upon the requirements of the prevailing circumstances.

Figure 7:
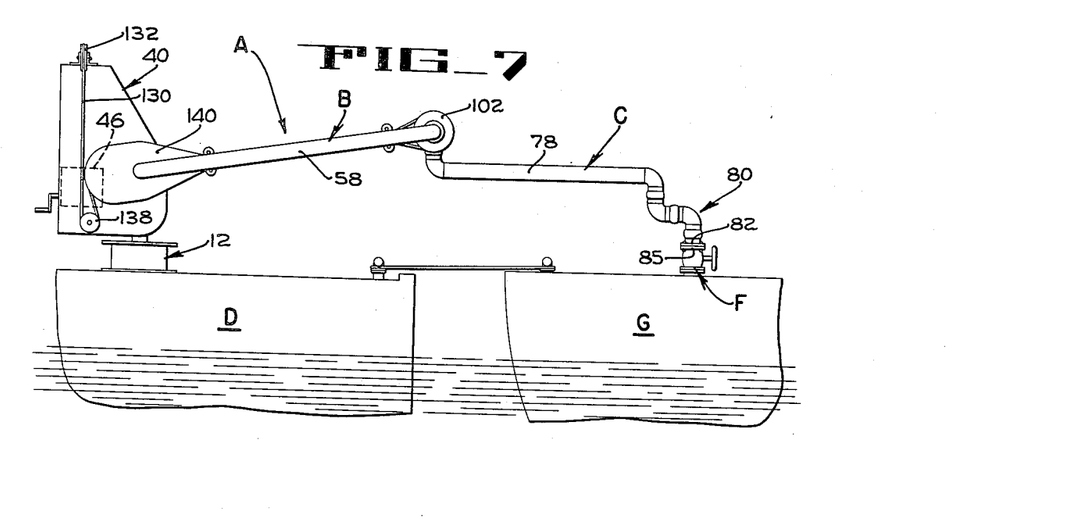
Figs. 7 and 8 are diagrammatic elevations of the apparatus of the invention in different positions, showing how the apparatus adapts itself to movements of a barge to which the apparatus is connected, relative to the dock on which the apparatus is mounted.
Figure 8:
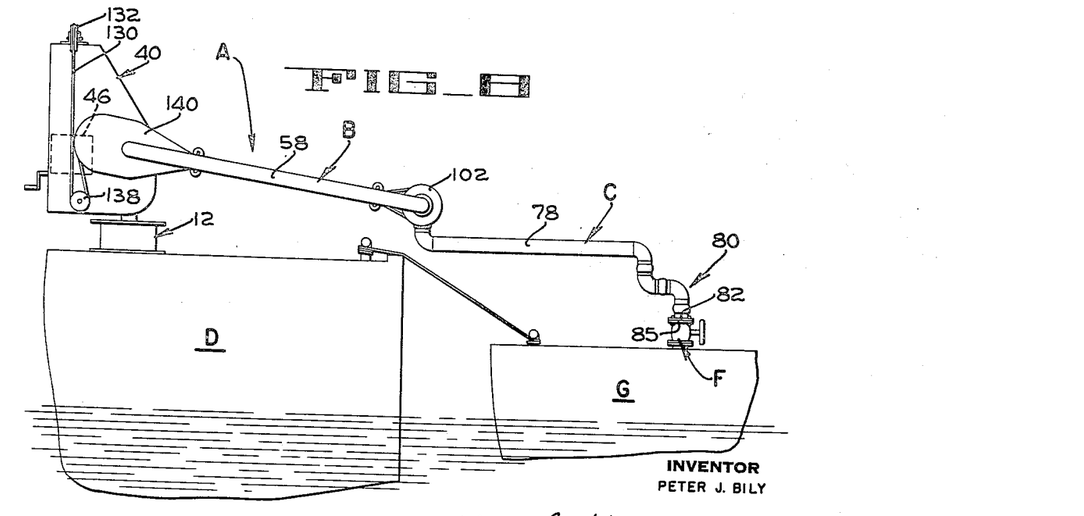

As hereinabove explained, the counterweight 46 and the high ratio gear train 160 cooperate to yieldably retain the hose A in any selected position of vertical adjustment, thus avoiding the necessity of locking the apparatus after a desired positioning of its component parts has been attained. This feature is particularly important for the reason that it leaves the apparatus in a condition wherein it is free to move in conformity with any movements of a barge or other movable carrier which normally might occur while the hose A is coupled thereto. For example, if during an early stage of a barge loading or unloading operation, the position of the barge G is as illustrated in Fig. 7, and if thereafter, but while the hose A remains connected to the barge flange 85, the barge G moves to a lower position, as in response to lowering of the tide, the hose A can freely accommodate itself to the lowering barge by a further downward pivotal movement of the inner hose section B, as illustrated in Fig. 8, while the outer hose section C maintains its horizontal attitude, and without developing any interference with the progress of the transference of fluid between dock D and barge G.

Figure 9:
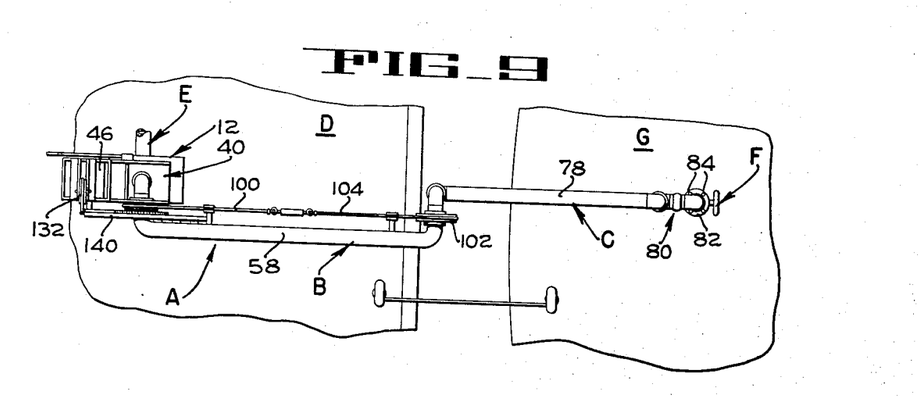
Figs. 9 and 10 are diagrammatic plan views of the apparatus in different operational positions, further illustrating how the apparatus adapts itself to movements of a barge being loaded or unloaded by the apparatus of the invention.
Figure 10:
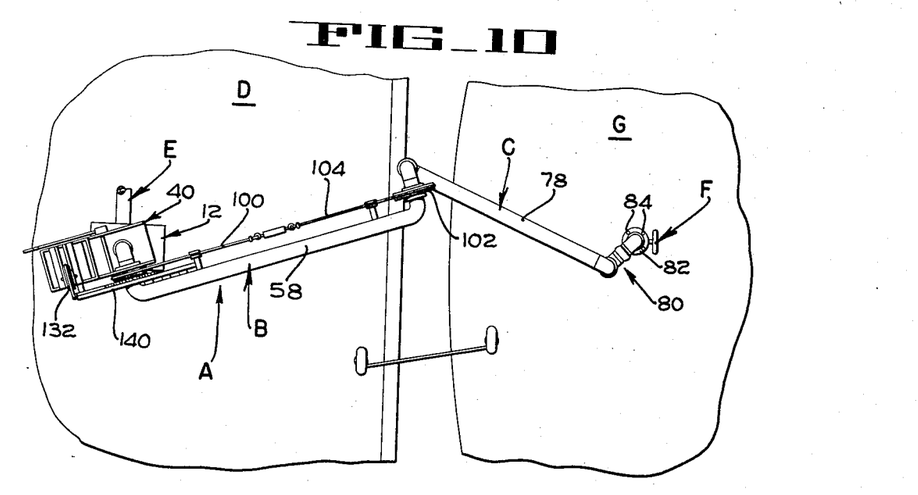

The apparatus is likewise capable of adapting itself to variation in the distance of the barge G from the dock D, due to the freedom of pivotal movement of the hose sections B and D about the vertical axes of the swivel joints 22 (Fig. 3) and 70 (Figs 1, 2 and 3) respectively, as will be appreciated by making comparison of the positions of the barge G with relation to the dock D illustrated in Figs. 9 and 10, respectively. Fig. 9 shows the barge at approximately the maximum spacing from the dock which permits use of the apparatus of the invention, since in order to make connection to the barge flange F while the barge is so disposed, both hose sections require being placed in substantially perpendicular relationship to the edge of the dock where the barge is moored, in order for the hose A to reach the barge flange F. If, after connection between the hose A and the barge flange F has been completed under these circumstances, the barge moves toward the dock, the lessening of the spacing of the barge flange F from the mounting of the fluid transferring apparatus is automatically compensated for by pivoting of the inner hose section B in one direction about the vertical axis of the swivel joint 22 and pivotal movement of the outer hose section C in the opposite direction about the vertical axis of the swivel joint 70, as indicated in Fig. 10.

The freedom with which the hose sections B and C can move horizontally about the vertical axes of the swivel joints 22 and 70, respectively, permits the apparatus to accommodate itself to a reasonable amount of shifting of the barge along the dock without interference with progress of a loading or unloading operation by means of the apparatus of the invention, the only limitation being that the extent of such shifting of the barge shall not be so great as to place the barge flange 85 beyond the maximum reach of the hose A.

It will be understood from the hereinabove description of the manner in which the hose A is moved from its inoperative, or stored position (Fig. 1) to an operative position (Figs. 7–10) that upon completion of the operation of transferring fluid that required coupling of the hose to the barge flange 85, the apparatus can be returned to its stored position by a reversal of the described operation. In moving the hose A either to operating position or to inoperative position, a lone operator can easily handle the entire apparatus easily, quickly, and without any of the dangerous, heavy lifting required when a conventional hose made of flexible material is employed.

While a particular embodiment of the present invention has been shown and described, it will be understood that the fluid transferring apparatus is capable of modification and variation while still employing the principles of the invention. It is to be understood, therefore, that the scope of the invention should be limited only by the scope and proper interpretation of the claims appended hereto.

The invention having thus been described, that which is believed to be new and for which protection by Letters Patent is desired, is:

1. Apparatus for conducting fluid, comprising a tubular riser, a frame structure mounted on said riser for rotation about a vertical axis, a first rigid tube communicating with said riser and mounted on said frame structure pivotal movement with respect thereto about a horizontal axis, a second rigid tube communicating with said first tube and mounted on the same for pivotal movement relative thereto about a horizontal axis, coupling means carried by said second tube and flexible drive means connecting said second tube to said frame structure to retain the second tube in a predetermined orientation with relation to the horizontal.

2. Apparatus for conducting fluid, comprising horizontally disposed fluid conducting means, a swivel pipe joint mounted on said fluid conducting means in coaxial alignment therewith, a first rigid tube projecting radially from the axis of said fluid conducting means and connected at one end to said swivel pipe joint to mount the tube on said fluid conducting means for pivotal movement about said axis thereof, a swivel pipe joint communicating with and projecting laterally from the tube at the other end thereof, the axes of said swivel pipe joints being parallel to each other, a second tube, means connecting said second tube to the swivel pipe coupling at said other end of the first tube and including a part projecting axially from the associated swivel pipe coupling and a part projecting radially therefrom, a first pulley secured rigidly to said fluid conducting means in coaxial alignment therewith, a second pulley secured coaxially to said axially projecting part of said connecting means in planar alignment with said first pulley, and flexible drive means trained around and stretched between said pulleys to retain said second tube in predetermined orientation with relation to the horizontal for maneuvering said second tube by movement of said first tube.

3. Apparatus for conducting fluid, comprising horizontally disposed fluid conducting means, a swivel pipe joint mounted on said fluid conducting means in coaxial alignment therewith, a first rigid tube projecting radially from the axis of said fluid conducting means and connected at one end to said swivel pipe joint to mount the tube on said fluid conducting means for pivotal movement about said axis thereof, a swivel pipe joint communicating with and projecting laterally from the tube at the other end thereof, the axes of said swivel pipe joints being parallel to each other, a second tube, means connecting said second tube to the swivel pipe coupling at said other end of the first tube and including a part projecting axially from the associated swivel pipe coupling and a part projecting radially therefrom, said second tube including a part projecting from said radially projecting part of said connecting means in a plane parallel to the axis of said axially projecting part, and a swivel pipe joint included within said radially projecting part, a first pulley secured rigidly to said fluid conducting means in coaxial alignment therewith, a second pulley secured coaxially to said axially projecting part of said connecting means in planar alignment with said first pulley, and flexible drive means trained around and stretched between said pulleys to retain said second tube in predetermined orientation with relation to the horizontal for maneuvering said second tube to a position adjacent said other fluid handling means by movement of said first tube.

4. Apparatus for conveying fluid from one fluid handling means to another, comprising an inner hose member, means mounting the inner hose member for pivotal movement about a vertical axis and about a horizontal axis, both of said axes being adjacent one end of said inner hose member, an outer hose member pivotally connected to the other end of the inner hose member for movement of one hose member relative to the other hose member about an axis parallel to said horizontal axis and about an axis parallel to said vertical axis, and a mechanical drive mechanism connecting the outer hose member to said mounting means so that the outer hose member is maintained in a predetermined relationship with the horizon while the inner hose member pivots about either of said axes of its pivotal mounting.

5. Fluid conveying apparatus comprising a first rigid tube mounted for pivotal movement in a vertical plane about a horizontal axis adjacent one end of the tube, a first circular drive member mounted with its center lying in said horizontal axis and fixed against turning about said axis, a second rigid tube carried by said first tube with the weight of said second tube supported by said first tube, a swivel pipe joint interconnecting said first and second tubes and maintaining fluid-conducting communication therebetween, a second circular drive member rigidly secured to said second tube with the center of said second circular drive member lying in the axis of said swivel pipe joint, and flexible drive means extending between and trained around said first and second circular drive means for controlling the angularity between said tubes.

6. Fluid conveying apparatus comprising a first rigid tube mounted for pivotal movement about a first axis adjacent one end thereof and extending in a plane perpendicular to the tube, a first circular drive member with its center lying within said first axis and fixed against turning about the same, a second rigid tube carried by said first tube with the weight of said second tube supported by said first tube, a swivel pipe joint maintaining fluid conducting communication between said first and second tubes and mechanically interconnecting the tubes for pivotal movement of one of the tubes relative to the other about a second axis parallel to said first axis, a second circular drive member rigidly secured to said second tube with the center of said second circular drive member lying in said second axis, and flexible drive means interconnecting and trained around said first and second circular drive members to control the angularity between said tubes.

References Cited in the file of this patent

UNITED STATES PATENTS

| | | |
|---|---|---|
| 1,781,456 | Gold et al. | Nov. 30, 1911 |
| 1,860,956 | Russell | May 31, 1932 |
| 2,451,269 | Allen | Oct. 12, 1948 |

UNITED STATES PATENT OFFICE

CERTIFICATE OF CORRECTION

Patent No. 2,927,607

March 8, 1960

Peter J. Bily

It is hereby certified that error appears in the printed specification of the above numbered patent requiring correction and that the said Letters Patent should read as corrected below.

Figures 2, 6:
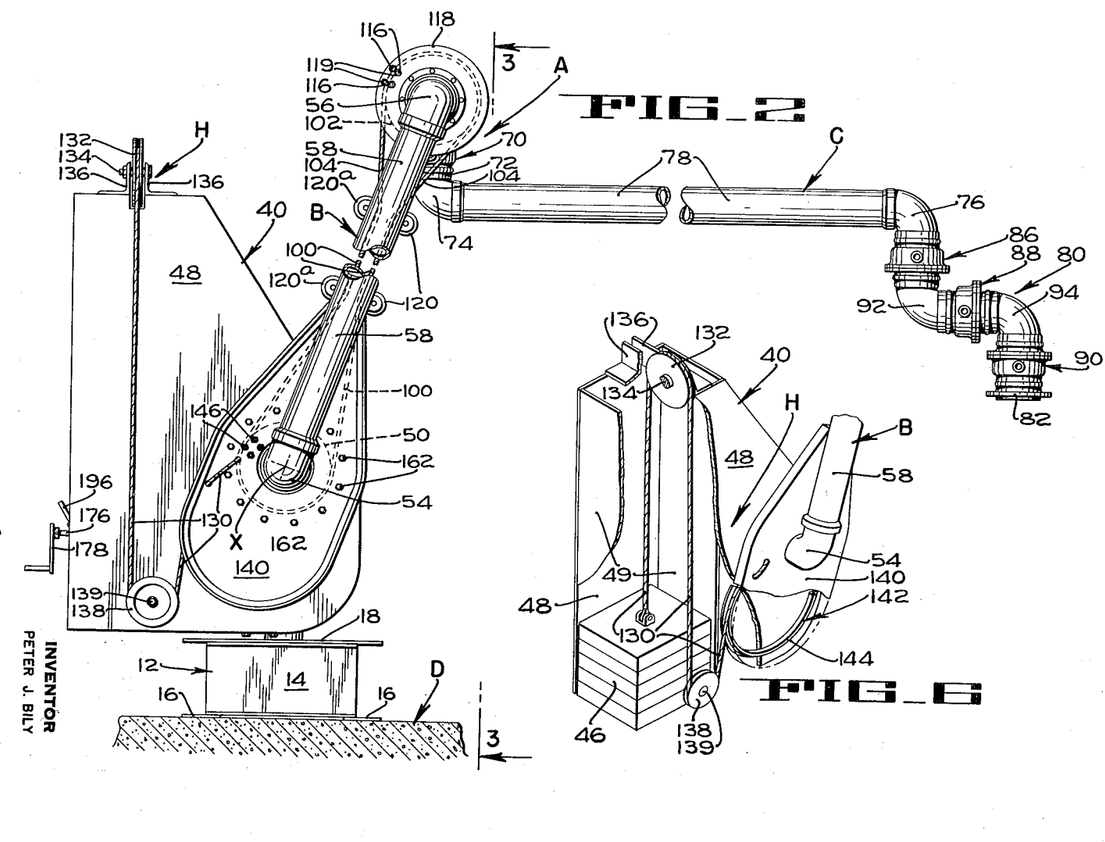
Fig. 2 is an elevation partly broken away, showing the opposite side of the apparatus with one section of the hose moved to an alternative position.
Fig. 6 is a fragmentary perspective partly broken away, showing the counterbalancing mechanism of the apparatus of the invention.

Column 5, line 13, for "Figs. 2" read -- Fig. 2 --; column 7, line 41, for "to", first occurrence, read -- of --; column 9, line 71, strike out "for" and insert the same after "structure" in line 72, same column; column 11, line 17, before "with" insert -- mounted --.

Signed and sealed this 11th day of October 1960.

(SEAL)
Attest:

KARL H. AXLINE
Attesting Officer

ROBERT C. WATSON
Commissioner of Patents